United States Patent
Song et al.

(10) Patent No.: US 12,454,630 B2
(45) Date of Patent: Oct. 28, 2025

(54) DISPERSION COMPOSITION OF CERIUM OXIDE COMPOSITE POWDER

(71) Applicant: ADVANCED NANO PRODUCTS CO., LTD., Sejong (KR)

(72) Inventors: Se Ho Song, Sejong (KR); Moon Sung Cho, Sejong (KR); Jung Wan Kim, Daejeon (KR)

(73) Assignee: ADVANCED NANO PRODUCTS CO., LTD., Sejong (KR)

( * ) Notice: Subject to any disclaimer, the term of this patent is extended or adjusted under 35 U.S.C. 154(b) by 107 days.

(21) Appl. No.: 17/636,797

(22) PCT Filed: Jul. 7, 2021

(86) PCT No.: PCT/KR2021/008650
§ 371 (c)(1),
(2) Date: Feb. 18, 2022

(87) PCT Pub. No.: WO2022/010257
PCT Pub. Date: Jan. 13, 2022

(65) Prior Publication Data
US 2023/0121006 A1    Apr. 20, 2023

(30) Foreign Application Priority Data
Jul. 7, 2020    (KR) .................. 10-2020-0083681

(51) Int. Cl.
C09G 1/02    (2006.01)
C01F 17/235    (2020.01)
C09K 3/14    (2006.01)

(52) U.S. Cl.
CPC .............. *C09G 1/02* (2013.01); *C01F 17/235* (2020.01); *C09K 3/1409* (2013.01); *C01P 2004/64* (2013.01)

(58) Field of Classification Search
CPC ....... C01F 17/235; C09G 1/02; C09K 3/1409; C09K 3/1463
See application file for complete search history.

(56) References Cited

U.S. PATENT DOCUMENTS

| | | | | |
|---|---|---|---|---|
| 6,420,269 B2 * | 7/2002 | Matsuzawa | ........... | C01F 17/235 438/692 |
| 6,444,132 B1 * | 9/2002 | Orii | ...... | G11B 5/3103 451/36 |
| 2011/0252714 A1 * | 10/2011 | Haerle | ................ | C09K 3/1463 51/309 |

FOREIGN PATENT DOCUMENTS

| | | | | |
|---|---|---|---|---|
| KR | 10-20160009150 | * | 1/2016 | .......... C09K 3/1463 |
| WO | WO-0136332 A1 | * | 5/2001 | ............. B82Y 30/00 |

OTHER PUBLICATIONS

KR 20160009150 Espacenet Machine Translation (Year: 2024).*

* cited by examiner

*Primary Examiner* — Alexandra M Moore

(57) ABSTRACT

Proposed are cerium oxide composite powder and a dispersion composition containing the same powder. The powder includes two types of cerium oxide particles satisfying different specific particle size ranges. When the average density of the cerium oxide composite powder in a dispersion composition solution is controlled to be in a specific range, the dispersion composition can provide a high polishing rate without causing damage to a substrate and has good storage stability.

6 Claims, 5 Drawing Sheets

DISPERSION COMPOSITION OF CERIUM OXIDE COMPOSITE POWDER

CROSS REFERENCE TO RELATED APPLICATION

The present application claims priority to Korean Patent Application No. 10-2020-0083681, filed Jul. 7, 2020, the entire contents of which is incorporated herein for all purposes by this reference.

BACKGROUND OF THE INVENTION

1. Field of the Invention

The present invention relates to a dispersion composition including a cerium oxide composite powder containing two types of cerium oxide particles having different particle sizes.

2. Description of the Related Art

As semiconductor devices are highly integrated, an under-layer planarization technique is required to secure a photolithography margin and minimize the wiring length. As the under-layer planarization technique, borophosphorus silicate glass (BPSG) reflow, spin-on-glass (SOG) etch back, chemical mechanical polishing (CMP), etc. are known.

Among them, the CMP process is considered a powerful planarization technology for next-generation semiconductor devices because it can achieve low-temperature planarization and large-area planarization that are difficult to achieve with the reflow process or the etch-back process. In addition, as the thickness of wirings is increased to reduce the wiring resistance, the thickness of inter-metal dielectric (IMD) layers for electrical insulation between metal wirings needs to be increased. This significantly increases the amount of an IMD layer to be removed in a CMP process for planarization. In addition, the CMP process with existing CMP slurry has a problem in that the removal rate is slow and the CMP time is long, so that the process productivity is deteriorated.

As a solution to this problem, the use of a surface-modified colloidal ceria abrasive particle dispersion composition in which ceria abrasive particles are coated with a cerium element and a hydroxyl group (—OH) is considered. However, since such a dispersion composition is formed such that the surface of large ceria abrasive particles is coated with small ceria abrasive particles with relatively high activity, the mechanical properties of the large ceria abrasive particles cannot be sufficiently exhibited, and the polishing rate cannot be not sufficiently improved.

On the other hand, it is possible to consider a dispersion composition that uses hydroxide particles of a tetravalent metal element and in which the density of the particles is specifically limited, to achieve both reduction of polishing damage and improvement of polishing rate while improving chemical activity. However, such hydroxide particles cannot sufficiently improve the polishing rate because the mechanical properties thereof cannot be sufficiently exhibited due to their poor crystallinity.

Meanwhile, a method of using a mixture of different particles including first particles containing cerium oxide and second particles containing hydroxides of a tetravalent metal may be considered. However, this approach has problems in that the use of an additive including a special compound is required due to aggregation between the hydroxide particles, and scratches may occur during CMP because the particles in the dispersion composition has large sizes.

(Patent Literature 1) Korean Patent Application Publication No. 10-2002-0007607

SUMMARY OF THE INVENTION

Technical Problem

The present invention is made to solve the problems occurring in the related art, and an objective of the present invention is to provide a dispersion in which first cerium oxide particles have a prismatic shape to maximize mechanical effects on an insulating film and in which second cerium oxide particles smaller than the first cerium oxide particles are shaped to have an increased specific surface area to maximize chemical effects on the insulating film. That is, the objective of the present invention is to achieve both the mechanical effect and the chemical effect by mixing the first particles exhibiting a strong mechanical action and the second particles exhibiting a strong chemical action. In addition, by controlling the range of the density of a cerium oxide composite powder contained in a solution, the present invention provides a cerium oxide composite powder having high stability not to aggregate and providing a high polishing rate and provides a dispersion composition including the cerium oxide composite powder.

Technical Solution

To solve the above problems, the inventors of the present application made diligent research and have finally developed a dispersion composition including particles that have high dispersion stability, good crystallinity, and highly activate surfaces so that the dispersion composition has good chemical and mechanical polishing properties.

The present invention is a dispersion composition in which first cerium oxide particles and second cerium oxide particles are combined, in which the first cerium oxide particles have a sharp prismatic shape, have excellent crystallinity, and are relatively large to have a powder density of 6.5 g/mL or more, and the second cerium oxide particles have a spherical shape, have excellent crystallinity, have a surface activated by hydrothermal synthesis, and are relatively small to have a powder density of 2.5 g/mL or less. In addition, the first cerium oxide particles and the second cerium oxide particles are not present in a core-shell form in a solution and are separately dispersed and aggregated.

Most of the volume of each nano-sized particles is on the surface. Therefore, in the present invention, a strong crushing and milling process is performed to modify the surface of particles having excellent crystallinity so that the composite powder is controlled to have a density of 3.0 g/mL or less. Thus, the core portion of the particle has excellent crystallinity, and the surface portion contains many hydroxyl groups. With this structure, lattice connections are concentrated on the core portion of the volume, and most of the volume disposed on the surface is composed of hydroxyl groups. Thus, the dispersion composition exhibits both mechanical and chemical polishing properties, thereby realizing a high polishing rate for an oxide film.

In addition, in the present invention, although the composite powder obtained through the process described above has a low density of about 2.55 g/mL to 2.95 g/mL, the composite powder not only has excellent mechanical and chemical polishing properties but also has good dispersion stability due to less aggregation between particles. In particular, large particles with sharp edges play an important role in improving mechanical polishing properties, and small particles with a spherical shape have excellent crystallinity through hydrothermal synthesis and have many hydroxy groups on the surface thereof through the process. These large and small particles give a synergistic effect in abrasive action.

More specifically, the present invention provides a cerium oxide composite powder including first cerium oxide particles having an average particle of 15 nm or more and second cerium oxide particles having an average particle size of 10 nm or less. The mixing ratio of the first cerium oxide particles and the second cerium oxide particles may be in a range of 9.5:0.5 to 0.5:9.5 (wt./wt.), preferably in a range of 8:2 to 2:8 (wt./wt.), and more preferably in a range of 6:4 to 4:6 (wt./wt.).

In addition, when the cerium oxide composite powder is observed under a transmission electron microscope (TEM), the powder may contain 50 to 19,000 second cerium oxide particles on average per unit area (550 nm in width and 550 nm in length) per one first cerium oxide particle. In addition, the average BET specific surface area of the cerium oxide composite powder may be 50.00 $m^2/g$ or more.

In addition, the D50 particle size of the cerium oxide composite powder slurry may be
in a range of 50 nm to 180 nm when the size is measured with a Zetasizer,
in a range of 60 nm to 350 nm when the size is analyzed with a Microtrac, or
in a range of 30 nm to 70 nm when the size is measured with a Lumisizer.

Furthermore, the present invention provides a dispersion composition containing the cerium oxide composite powder described above. Here, the average density of the cerium oxide composite powder contained in the dispersion composition may range from 2.55 g/mL to 2.95 g/mL when the dispersion composition is dried at 60° C. under vacuum conditions for 72 hours. In addition, the average density of the cerium oxide composite powder contained in the dispersion composition may range from 1.0 g/mL to 2.95 g/mL when the dispersion composition is in the form of a solution. In addition, the dispersion composition dispersed at a concentration of 0.007 wt % may exhibit an absorbance of 0.02 to 0.19% at a wavelength of 450 to 600 nm and a transmittance of 70 to 90% at a wavelength of 500 nm. In addition, the dispersion composition may exhibit a change of 5% or less in average particle size when the dispersion composition is stored at 40° C. for 30 days or longer.

Advantageous Effect

The cerium oxide composite powder according to the present invention contains two types of cerium oxide particles satisfying different specific particle size ranges. Since the average density of the cerium oxide composite powder contained in a dispersion composition solution is controlled, and the cerium oxide composite powder with the controlled average density is used for a dispersion composition, the dispersion composition can provide a high polishing rate without causing damage to a substrate and has good storage stability.

DESCRIPTION OF THE PREFERRED EMBODIMENTS

Figure 1:
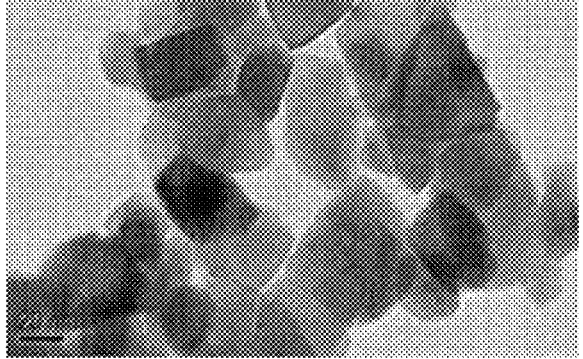
FIG. 1 is a transmission electron microscope (TEM) analysis image of cerium oxide particles and cerium oxide composite powder obtained in Preparation Examples, Examples, and Comparative Examples.
Figure 1:
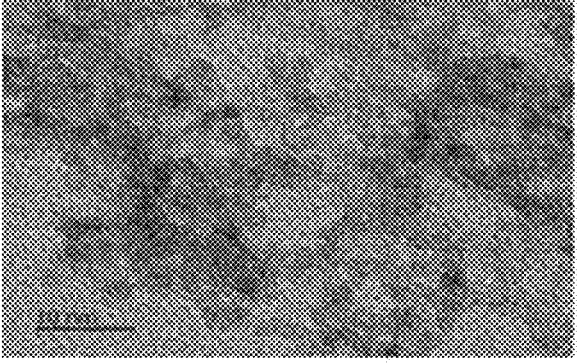
Figure 1:
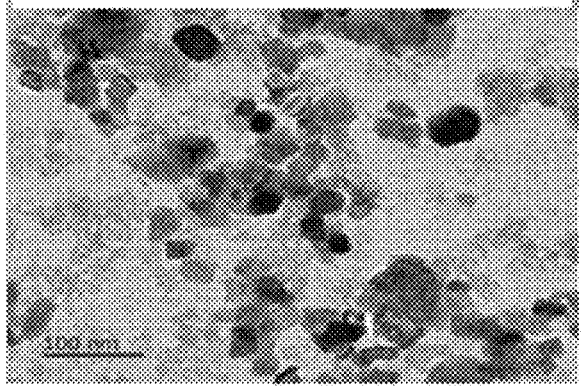
Figure 1:
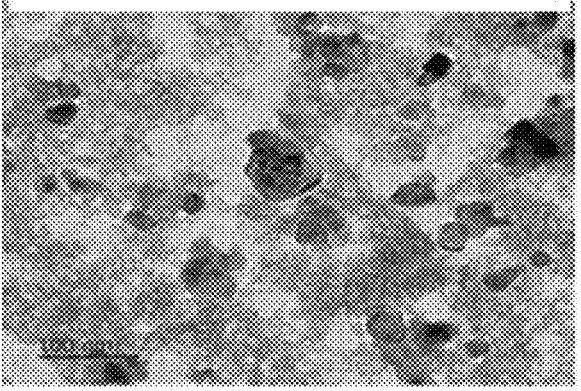
Figure 1:
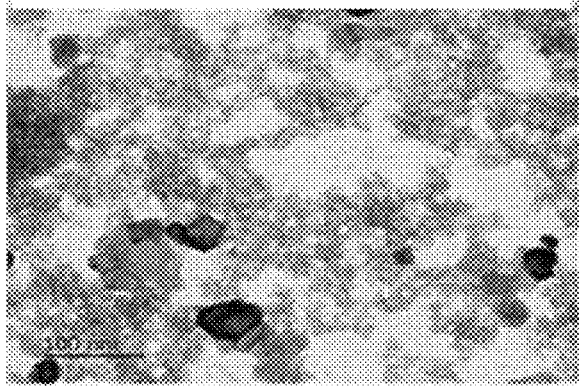
Figure 2:
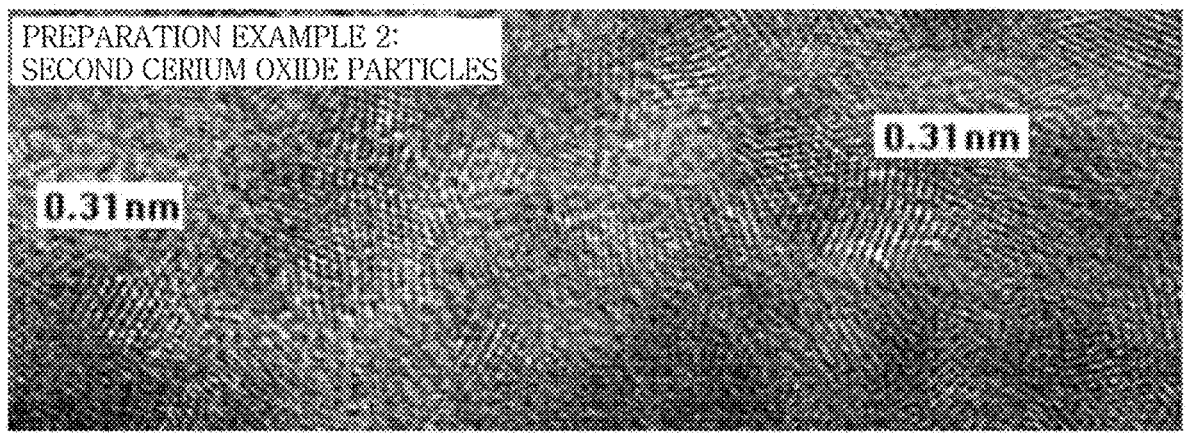
FIG. 2 is a transmission electron microscope (TEM) analysis image showing the lattice spacing of second cerium oxide particles obtained in Preparation Example 2.

Prior to a description of the present invention, it should be noted that the terms used in the present specification are used only to describe specific examples and are not intended to limit the scope of the present invention which will be defined only by the appended claims. Unless otherwise defined herein, all terms including technical and scientific terms used herein have the same meaning as commonly understood by those who are ordinarily skilled in the art to which this invention pertains.

Unless otherwise stated herein, it will be further understood that the terms "comprise", "comprises", and "comprising", when used in this specification, specify the presence of stated features, regions, integers, steps, operations, elements and/or components but do not preclude the presence or addition of one or more other features, regions, integers, steps, operations, elements, components and/or groups thereof.

In addition, in this specification, "A to B" indicating a range means a range that is equal to A or greater and is equal to B or less.

Hereinafter, the present invention will be described in detail.

More specifically, the present invention provides a cerium oxide composite powder including first cerium oxide particles having an average particle size of 15 nm or more and second cerium oxide particles having an average particle size of 10 nm or less. In the composite powder, the two types of particles may be separately present or may be in contact with each other. The two types of particles may for separate aggregates, respectively. In this case, the composite powder does not exist in a core-shell form in which the second cerium oxide particles cover the surface of each of the first cerium oxide particles to maintain the good mechanical polishing properties of the first cerium oxide particles.

The cerium oxide composite powder according to the present invention includes two types of cerium oxide particles having different average particle sizes, and the two types of cerium oxide particles have different specific particle size ranges from each other. Specifically, the cerium oxide composite powder includes first cerium oxide particles having an average particle size of 15 nm or more and second cerium oxide particles having an average particle size of 10 nm or less. More specifically, the average particle size of the first cerium oxide particles may be in a range of 15 to 60 nm, 20 to 55 nm, 25 to 50 nm, or 30 to 45 nm. Alternatively, the average particle size of the first cerium oxide particles may be or 20 nm or more and less than 40 nm. On the other hand, the average particle size of the second cerium oxide particles may be in a range of 1 to 10 nm, 1 to 6 nm, or 2 to 5 nm.

Alternatively, the average particle size of the second cerium oxide particles may be 1 nm or more and less than 3 nm.

The first cerium oxide particles having a relatively large average particle size are not limited in shape, but preferably have a prismatic shape. With the shape, the polishing rate can be more improved. In addition, the cerium oxide composite powder may include the first cerium oxide particles and the second cerium oxide particles in a weight ratio (wt./wt.) in a range of 9.5:0.5 to 0.5:9.5, and specifically in a range of 8:2 to 2:8. More specifically, the weight ratio (wt./wt.) may be in a range of 6:4 to 4:6. In some cases, the weight ratio (wt./wt.) may be in a range of 5.5:4.5 to 4.5:5.5.

Accordingly, when the cerium oxide composite powder is observed under a transmission electron microscope (TEM), the powder may contain 50 to 19,000 second cerium oxide particles on average per unit area (550 nm in width and 550 nm in length) per one first cerium oxide particle. In addition, when the cerium oxide composite powder is observed under a transmission electron microscope (TEM), the powder may contain 650 to 1500 second cerium oxide particles on average per unit area (550 nm in width and 550 nm in length) per one first cerium oxide particle. Alternatively, the power may contain 650 to 1500 second cerium oxide particles in the same condition.

In addition, the cerium oxide composite powder may include two types of cerium oxide particles having different average particle sizes in the above-mentioned ratio. The average particle size range may vary depending on measurement methods.

For example, the particle size distribution of the cerium oxide composite powder is 50 nm to 180 nm when analyzed with a zeta potential measuring instrument (Zetasizer); 60 nm to 350 nm when analyzed with a Microtrac; and 30 nm to 70 nm when analyzed with a Lumisizer.

Specifically, the particle sizes of the cerium oxide composite powder may be distributed:
- in a range of 70 nm to 150 nm or in a range of 100 nm to 110 nm when analyzed with a Zetasizer;
- in a range of 120 nm to 200 nm or in a range of 175 nm to 185 nm when analyzed with a Microtrac; or
- in a range of 30 nm to 50 nm or in a range of 35 nm to 45 nm when analyzed with a Lumisizer.

Here, the particle size is a D50 particle size corresponding to the particle size of 50% of the total particles, and the particle size values obtained with a zeta potential measuring device (Zetasizer) and a laser particle size analyzer (Microtrac) are volume average diameters Dv(50).

The larger the size of the cerium oxide particles contained in the cerium oxide composite powder, the higher the polishing rate when the cerium oxide composite powder is used as an abrasive. However, when the particle size is large, the small specific surface area of the particles is reduced, the chemical activity of the abrasive is reduced, and damage is caused to the surface of a polished substrate. On the contrary, when the cerium oxide particles have a small size, the chemical activity of the abrasive is improved and damage to the surface of a polished substrate is reduced. However, in this case, there is a problem in that the polishing rate is significantly lowered.

In the present invention, since the cerium oxide composite powder includes two types of cerium oxide particles having different particle sizes, and the average particle size of the cerium oxide particles and the particle size distribution D50 of the cerium oxide composite powder in which the two types of particles are mixed are controlled to fall within the ranges described above, it is possible to prevent the surface of a polished substrate from being damaged, to significantly improve the polishing rate by maximizing the chemical and mechanical activity of the abrasive, and to improve the storage stability of the abrasive.

In addition, the average BET specific surface area of the cerium oxide composite powder may be 50.00 $m^2/g$ or more. For example, the average BET specific surface area of the cerium oxide composite powder may range from 70.00 to 250 $m^2/g$, from 70.00 to 150 $m^2/g$, from 70.00 to 90 $m^2/g$, from 120.00 to 200 $m^2/g$, from 150.00 to 250 $m^2/g$, from 110.00 to 160 $m^2/g$, from 130.00 to 150 $m^2/g$, or from 180.00 to 240 $m^2/g$.

According to the present invention, by controlling the average BET specific surface area of the cerium oxide composite powder to fall within the above-mentioned range, it is possible to maximize the contact between a to-be-polished surface and a dispersion composition containing the powder during a polishing process. Therefore, it is possible to chemically polish the surface of the substrate while preventing damage to the surface of the substrate.

Furthermore, the present invention provides a dispersion composition containing the cerium oxide composite powder described above.

The dispersion composition according to the present invention contains a cerium oxide composite powder having two types of cerium oxide particles having different particle sizes that specify specific ranges. Therefore, the dispersion composition provides a high polishing rate without damaging a substrate during polishing and has good storage stability.

Here, the average density of the cerium oxide composite powder contained in the dispersion composition may range from 2.55 g/mL to 2.95 g/mL when the dispersion composition is dried at 60° C. under vacuum conditions for 72 hours. In addition, the average density of the cerium oxide composite powder contained in the dispersion composition may range from 1.0 g/mL to 2.95 g/mL when the dispersion composition is present in a solution form. Here, the average density of the cerium oxide composite powder contained in the dispersion composition may range from 2.55 g/mL to 2.95 g/mL when the dispersion composition is dried at 60° C. under vacuum conditions for 72 hours. Specifically, the average density of the cerium oxide composite powder may range from 2.70 g/mL to 2.85 g/mL in the same conditions. As an example, the average density of the cerium oxide composite powder contained in the dispersion composition may be 2.81±0.05 g/mL.

Here, the average density of the cerium oxide composite powder contained in the solution of the dispersion composition may range from 1.0 g/mL to 2.8 g/mL when the dispersion composition is dried for 2 hours, and more specifically range from 1.6 g/mL to 1.8 g/mL. As an example, the average density of the cerium oxide composite powder contained in the dispersion composition may be 1.69±0.05 g/mL. According to the present invention, the density of the cerium oxide composite powder contained in the solution of the dispersion composition to fall within the above-mentioned range. Therefore, it is possible to improve the polishing rate that is deteriorated when the density of the cerium oxide composite powder is low and thus the action of particles on a film to be polished is week. In addition, it is possible to prevent damage to a substrate surface while maintaining the high density of the cerium oxide composite powder.

In addition, the dispersion composition according to the present invention has good storage stability to the extent that the change in average particle size is within 5% when the dispersion composition is stored at 40° C. for 30 or more days. Therefore, the good polishing properties of the dispersion composition can be uniformly exhibited even when the dispersion composition is used after a lengthy period of storage.

Furthermore, the dispersion composition may use water as a solvent. In this case, one or more organic solvents may be mixed with water. In this case, the dispersion composition may be a mixture in which the cerium oxide composite powder of the present invention is dispersed in an amount of 0.3% to 15% by weight in a solvent.

In addition to the cerium oxide composite powder, the dispersion composition may include various additives including, for example, a dispersant, a defect inhibitor, an oxidizing agent, a polishing accelerator, a pH adjusting agent, and the like.

The dispersant may be at least one selected from the group consisting of nitric acid, formic acid, acetic acid, benzoic acid, oxalic acid, succinic acid, malic acid, maleic acid, malonic acid, citric acid, lactic acid, aspartic acid, glutaric acid, adipic acid, and salts thereof.

On the other hand, the method for preparing the cerium oxide composite powder and dispersion composition according to the present invention is not particularly limited, and any method commonly used in the related art may be used. For example, the cerium oxide composite powder may be prepared by a wet oxidation method, a sol gel method, a hydrothermal synthesis method, a calcination method, or the like. For example, a cerium oxide is obtained by mixing a cerium precursor and a basic material to oxidize the cerium precursor. Then, the cerium oxide is sequentially washed, dried, pulverized, thermally treated, and diluted with water to prepare a dispersion composition containing a cerium oxide composite powder. The method of preparing the cerium oxide composite powder of the present invention will be described with reference to examples described below. The cerium precursor is not particularly limited and may be preferably in the form of a salt. The non-limiting examples of the cerium precursor include cerium nitrate, cerium acetate, cerium chloride, and cerium carbonate, cerium ammonium nitrate, hydrates thereof. These materials may be used alone or in combination of two or more.

Hereinafter, the present invention will be described in more detail with reference to examples. Since the following description is made only for specific examples of the present invention, the scope of the rights defined in the claims should not construed to be limited by the description even though there are assertive and limiting expressions in the description.

<Preparation Example 1> Preparation of First Cerium Oxide Particles

A precursor solution was prepared by dissolving 1.85 kg of cerium carbonate hydrate $(Ce_2(CO_3)_3) \cdot xH_2O)$ in 18.15 kg of water and 2.4 kg of nitric acid (HNO3), followed by stirring for 1 hour. 6 kg of aqueous ammonia was added to the precursor solution. After the addition was completed, the temperature of the resulting solution was raised to 75° C. and the solution was reacted for 6 hours while being stirred. The obtained precipitate was filtered with a filter press, was washed, and was heat-treated at 1000° C. to prepare first cerium oxide particles. At this point, the density of the obtained particles was 6.5 g/mL or more.

<Preparation Example 2> Preparation of Second Cerium Oxide Particles

A second precursor solution was prepared by dissolving 1.2 kg of cerium ammonium nitrate $((NH_4)_2Ce(NO_3)_6)$ in 2 kg of water and then adding 10 g of hydrogen peroxide $(H_2O_2)$ to the resulting mixture, followed by stirring for 1 hour. 2 kg of aqueous ammonia was added to the precursor solution, and the reaction solution was subjected to a hydrothermal synthesis reaction at 200° C. The obtained precipitate was filtered with a filter press, was washed, and was heat-treated at 60° C. to prepare second cerium oxide particles. At this point, the density of the obtained particles was 2.5 g/mL or more.

<Comparative Preparation Example 1> Preparation of Cerium Hydroxide Particles 350 g of cerium ammonium nitrate $((NH_4)_2Ce(NO_3)_6)$ was dissolved in 7825 g of water and stirred to prepare a precursor solution. 750 g of imidazole was added to the precursor solution at a rate of 5 mL/min, to obtain a precipitate containing cerium hydroxide. The obtained precipitate was filtered with a filter press and washed to obtain cerium hydroxide particles.

Examples 1 to 7 and Comparative Examples 1 to 2

The first cerium oxide particles obtained in Preparation Example 1 and the second cerium oxide particles obtained in Preparation Example 2 were mixed as shown in Table 1 below, followed by crushing and wet milling. The milled dispersion composition was vacuum dried at 60° C. to prepare a cerium oxide composite powder.

TABLE 1

| Classification | Mixing ratio of the first cerium oxide particles and the second cerium oxide particles (wt./wt.) |
|---|---|
| Example 1 | 80:20 |
| Example 2 | 70:30 |
| Example 3 | 60:40 |
| Example 4 | 50:50 |
| Example 5 | 40:60 |
| Example 6 | 30:70 |
| Example 7 | 20:80 |
| Comparative Example 1 | 90:10 |
| Comparative Example 2 | 10:90 |
| Comparative Example 3[a] | 50:50 |

[a]In Comparative Example 3, the mixing ratio is the ratio of the first cerium oxide particles of Preparation Example 1 to the cerium hydroxide particles of Comparative Preparation Example 1. In this case, wet milling was not performed.

Examples 8 to 14 and Comparative Examples 4 to 6

As shown in Table 2 below, each of the cerium oxide composite powders obtained in Examples 1 to 7 and Comparative Examples 1 to 3 was mixed with water to be a concentration of 1.0 wt % and then dispersed to prepare a dispersion composition.

TABLE 2

| Classification | Composite powder used |
|---|---|
| Example 8 | Composite powder prepared in Example 1 |
| Example 9 | Composite powder prepared in Example 2 |

TABLE 2-continued

| Classification | Composite powder used |
|---|---|
| Example 10 | Composite powder prepared in Example 3 |
| Example 11 | Composite powder prepared in Example 4 |
| Example 12 | Composite powder prepared in Example 5 |
| Example 13 | Composite powder prepared in Example 6 |
| Example 14 | Composite powder prepared in Example 7 |
| Comparative Example 4 | Composite powder prepared in Comparative Example 1 |
| Comparative Example 5 | Composite powder prepared in Comparative Example 2 |
| Comparative Example 6 | Composite powder prepared in Comparative Example 3 |

<Experimental Example 1> Evaluation of Cerium Oxide Composite Powder

To evaluate the shape and particle size of the first and second cerium oxide particles used in the present invention and the particle size distribution and BET specific surface area of the cerium oxide composite powder containing the same, the first and second cerium oxide particles obtained in Preparation Examples 1 and 2 and cerium oxide particles obtained in Examples 1 to 7 and Comparative Examples 1 to 3 were tested as described below.

A) Particle Size and Shape Analysis of the First and Second Cerium Oxide Particles Transmission electron microscope (TEM) analysis on cerium oxide particles and cerium oxide composite powders obtained in Preparation Examples, Examples, and Comparative Examples was performed. The results are shown in FIG. 1.

Figure 3:
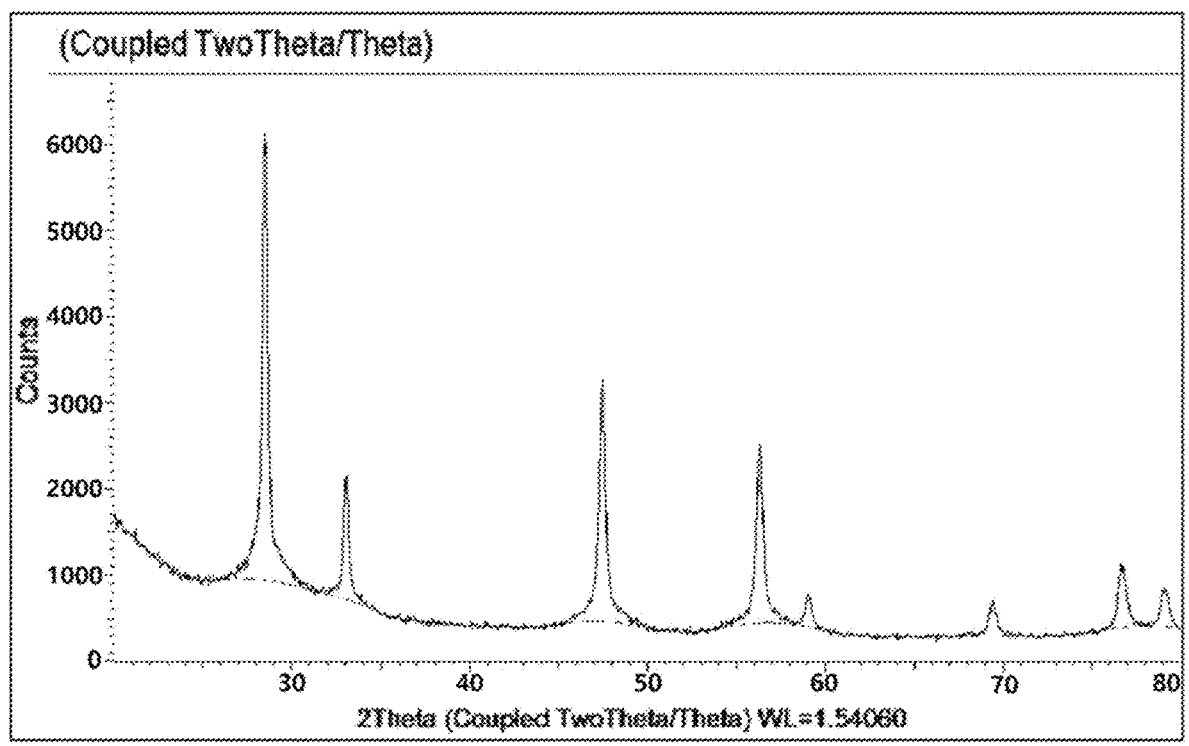
FIG. 3 is an X-ray diffraction (XRD) analysis image showing the crystallinity of cerium oxide composite powder obtained in Example.

Referring to FIG. 1, the cerium oxide composite powders of Examples have an average particle size of 20 to 50 nm. Each powder is composed of first cerium oxide particles having a polygonal shape and having an average particle size of 1 to 5 nm and second cerium oxide particles having a spherical shape. In addition, the crystallinity of the cerium oxide particles was observed with an X-ray diffraction (XRD) analyzer, and the results are shown in FIG. 3. In addition, it was confirmed that the second cerium oxide particles prepared in Preparation Example 2 had an average lattice spacing of 0.31±0.005 nm, and it was confirmed that each of the cerium oxide composite powders obtained in Examples 1 to 7, respectively, contains 50 to 19,000 second cerium oxide particles per one first cerium oxide particle.

These results mean that the cerium oxide composite powder according to the present invention includes only oxidized cerium particles, the cerium oxide particles are composed of two types of particles having specific sizes, and the two types of particles are mixed and/or dispersed at a specific ratio.

B) Analysis of Particle Size Distribution of Cerium Oxide Composite Powder (1) Zeta potential analyzer (Zetasizer) analysis, (2) laser particle size analyzer (Microtrac) analysis, and (3) Lumisizer analysis were performed on the cerium oxide particles and the cerium oxide composite powders obtained in Preparation Examples, Examples, and Comparative Examples, to measure 50% particle size (D50) of the cerium oxide particles and the cerium oxide composite powders. The results of the measurements are shown in Table 3.

TABLE 3

| Unit: nm | Dv (50) | | D50 |
|---|---|---|---|
| | Zetasizer | Microtrac | Lumisizer |
| Preparation Example 1 | 89.8 | 146.1 | 55.41 |
| Preparation Example 2 | 129.0 | 202.8 | 32.53 |
| Example 1 | 82.9 | 145.4 | 48.89 |
| Example 4 | 105.0 | 178.2 | 42.03 |
| Example 7 | 129.0 | 216.6 | 36.65 |

Referring to Table 3, the cerium oxide composite powder according to the present invention includes two types of cerium oxide particles having different particle sizes that are in different ranges depending on measurement methods.

C) BET Specific Surface Area Analysis of Cerium Oxide Composite Powder

BET specific surface area was measured for each cerium oxide particles and each cerium oxide composite powders obtained in Preparation Examples, Examples, and Comparative Examples.

As a result, it was confirmed that the average BET specific surface areas of the first cerium oxide particles and the second cerium oxide particles obtained in Preparation Examples 1 and 2 were 22.76 m2/g and 183.50 m2/g, respectively, and it was confirmed that the average BET specific surface areas of the cerium oxide composite powders obtained in Examples 1, 4 and 7 were 73.80 m2/g, 142.62 m2/g, and 178.57 m2/g, respectively.

<Experimental Example 2> Evaluation of Dispersion Composition

To evaluate the optical properties, storage stability, polishing efficiency, etc. of the dispersion composition according to the present invention, the experiments described below were performed on the dispersion compositions obtained in Examples 8 to 14 and Comparative Examples 4 to 6.

A) Evaluation of Optical Properties of Dispersion Composition

A slurry was prepared by dispersing the dispersion composition (first cerium oxide particles:second cerium oxide particles=50:50 wt. %/wt. %) obtained in Example 12 in distilled water to be a concentration of 0.007 wt. %. After that, about 4 mL of the slurry was placed in a cell that is 1 cm in width and 1 cm in length, and then the cell was loaded into a spectrophotometer. Then, the absorbance at a wavelength of 450 nm and transmittance at a wavelength of 500 nm were measured.

As a result, when the dispersion composition was dispersed to be a concentration of 0.007 wt. %, it was confirmed that the absorbance measured at the wavelength range of 450 to 600 nm was 0.027±0.005%, meaning the range of 0.02 to 0.19%. In addition, when the dispersion composition was dispersed to be a concentration of 0.007 wt. %, the transmittance at a wavelength of 500 nm was 85.35±0.005%, which was found to have a value within the range of 70 to 90%.

B) Density Evaluation of Cerium Oxide Particles in the Dispersion Composition

After mixing the cerium oxide particles obtained in Preparation Example 1, Preparation Example 2, and Comparative Preparation Example 1 according to compositions shown in Table 4 below, crushing and wet milling were performed to prepare a dispersion composition sample. The dispersion composition sample was stirred at 60° C. for 72 hours under vacuum conditions, and the density of the composite powder was measured. In addition, after dispersing the composite powder in distilled water to be a concentration of 5.0 wt. %, the density of the composite powder included in the solution of the dispersion composition was measured.

The measurement conditions are described below, and the results are shown in Table 4 and FIG. 4. In addition, in Comparative Example 3, the particles obtained in Preparation Example 1 and Comparative Preparation Example 1 were mixed to be a dispersion composition (first cerium oxide particles:second cerium hydroxide particles=50:50 wt. %/wt. %), and ultrasonic waves were applied to the dispersion composition to prepare a dispersion composition sample. The sample was dried at 60° C. for 72 hours under vacuum conditions, and the density of the composite powder was measured. In addition, after dispersing the composite powder in distilled water to be a concentration of 5.0 wt. %, the density of the composite powder included in the solution of the dispersion composition was measured:

(Condition (1)) After drying the crushed and wet-milled dispersion composition at 60° C. under vacuum conditions for 72 hours, the density of the dispersion composition was calculated according to Equation 1 using a 50 mL pycnometer.

(Condition (2)) After drying the mixed dispersion composition at 60° C. under vacuum conditions for 72 hours, the density of the dispersion composition was calculated according to Equation 1 using a 50 mL pycnometer:

$$PD=PW/PV, PV=CV-WV, WV=WW/WD$$ [Equation 1]

(PD: density of powder, PW: weight of powder, PV: volume of powder, CV: volume of pycnometer, WV: volume of water, WW: weight of water, and WD: density of water).

(Condition (3)) After dispersing the composite powders prepared in conditions (1) and (2) in distilled water to be a concentration of 5.0 wt. %, the density of the composite powder contained in the solution was calculated using Equation 2:

$$PD=PW/PV, PV=SV-WV, WV=WW/WD, \text{ and } WW=SW-PW$$ [Equation 2]

(PD: density of powder in solution, PW: weight of powder, PV: volume of powder, SV: volume of slurry, WV: volume of water, WW: weight of water, WD: density of water, and SW: weight of slurry).

TABLE 4

| | Condition 1 | Condition 2 |
|---|---|---|
| Sample of Example 8 (Mixing ratio = 80:20 wt./wt.) | 2.93 | 2.05 |
| Sample of Example 9 (Mixing ratio = 70:30 wt./wt.) | 2.88 | 1.85 |
| Sample of Example 10 (Mixing ratio = 60:40 wt./wt.) | 2.84 | 1.77 |

TABLE 4-continued

| | Condition 1 | Condition 2 |
|---|---|---|
| Sample of Example 11 (Mixing ratio = 50:50 wt./wt.) | 2.81 | 1.69 |
| Sample of Example 12 (Mixing ratio = 40:60 wt./wt.) | 2.71 | 1.55 |
| Sample of Example 13 (Mixing ratio = 30:70 wt./wt.) | 2.62 | 1.41 |
| Sample of Example 14 (Mixing ratio = 20:80 wt./wt.) | 2.56 | 1.28 |
| Sample of Comparative Example 5 | 4.59 | 3.42 |

Figure 4:
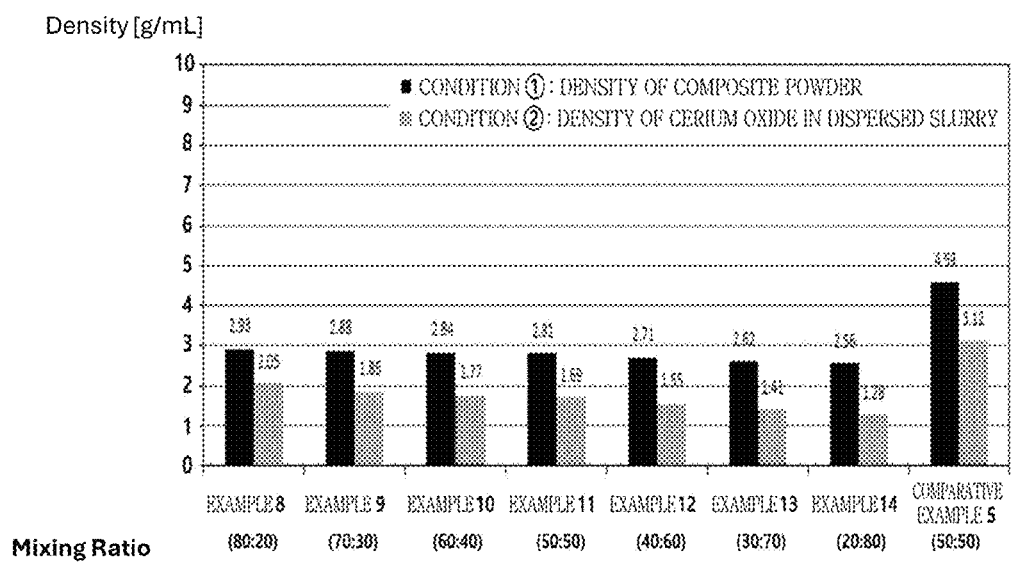
FIG. 4 is an analysis graph showing the density of a cerium oxide composite powder obtained in Example and the density of the cerium oxide composite powder contained in a solution.

Referring to Table 4 and FIG. 4, the dispersion composition according to the present invention has a specific density range for the cerium oxide composite powder.

C) Storage Stability Evaluation of Dispersion Composition

Samples in which the cerium oxide composite powders obtained in Preparation Examples 1 and 2 were dispersed in distilled water to be a concentration of 5.0 wt % were prepared. Then, the particle size distribution of each of the prepared samples and the cerium oxide composite powders contained in the respective dispersion compositions prepared in Examples 8, 11 and 14 and Comparative Example 5 was measured. The prepared samples and the dispersion compositions were left in a thermostat at 40° C. for 30 or more days. After 30 or more days, the average particle size of each of the samples and dispersion compositions was re-measured to confirm the change in particle size. The measurement results are shown in Table 5 below.

TABLE 5

| | Mixing ratio of first cerium oxide particles and second cerium oxide particles [wt./wt.] | Change in particle size |
|---|---|---|
| Sample of Preparation Example 1 (First cerium oxide particle) | 100:0 | <5% |
| Example 8 | 80:20 | <5% |
| Example 11 | 50:50 | <5% |
| Example 14 | 20:80 | <5% |
| Sample of Preparation Example 2 (Second cerium oxide particle) | 0:100 | <5% |
| Comparative Example 5 | 50:50 | <25% |

Since the dispersion composition according to the present invention does not show a substantial change in the particle size distribution of the cerium oxide composite powder even after long-term storage, the polishing properties of the dispersion composition can be uniformly exhibited even after a lengthy period of storage time.

D) Evaluation of Polishing Efficiency of Dispersion Composition

Samples in which the cerium oxide particles obtained in Preparation Examples 1 and 2 were dispersed in distilled water to be a concentration of 1.0 wt. % were prepared. The prepared samples and the dispersion compositions obtained in Examples 8 to 14 and Comparative Examples 3 to 5 were tested under the following conditions to measure the polishing rate of each dispersion composition, and the results are shown in FIG. 5.

Polishing test: CMP apparatus (mode no: Dusan UNIPLA 231)
Pad: IC1000TM A2 PAD 20'*1.18' ACAO:1Y10
Time: 60 sec
Spindle speed: 85 rpm
Wafer pressure: 5 psi
Slurry flow rate: 200 cc/min
Wafer: 8 inches (PETEOS)
Wafer thickness: 20000 Å

Figure 5:
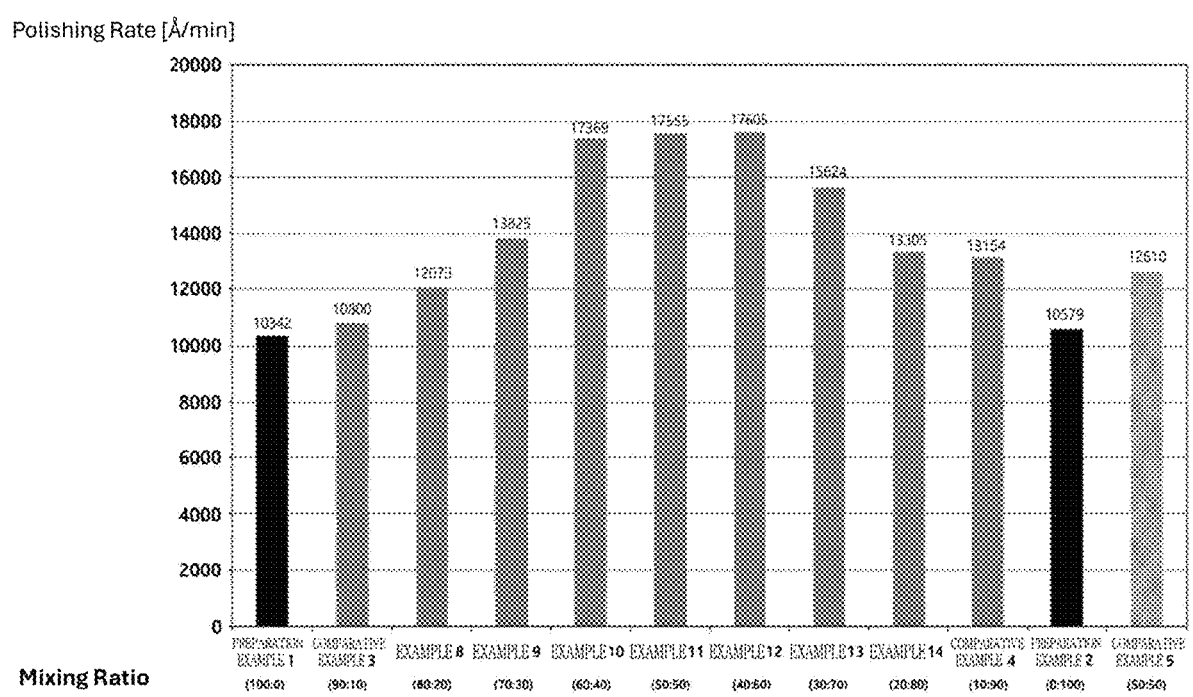
FIG. 5 is an evaluation graph for dispersion compositions obtained in Examples and Comparative Examples.

Referring to FIG. 5, the dispersion composition according to the present invention contains the first cerium oxide particles having a first specific particle size and the second cerium oxide particles having a second specific size in a predetermined mixing ratio. It is found that with the use of the dispersion composition according to the present invention, polishing can be performed without damaging the surface of a polished substrate. In addition, a higher polishing rate can be obtained compared to compositions comprising only the first cerium oxide particles having large particles or only the second cerium oxide particles having small particles.

Specifically, the dispersion compositions of Examples did not cause damage to the surface of the polished substrate, whereas the dispersion compositions of Preparation Example 1 or Comparative Example 3 containing the first cerium oxide particles alone or containing the first cerium oxide particles in a higher content ratio than the dispersion compositions of Examples caused damage to the surface of the polished substrate.

In addition, the dispersion compositions of Examples all exhibited a high polishing rate of about 12,000 Å/min or more. In particular, the dispersion compositions of Examples 10 to 12 in which the mixing ratio of the first cerium oxide particles and the second cerium oxide particles is in the range of 6:4 to 4:6 (wt./wt.) were found to exhibit a remarkably high polishing rate of 17000 Å/min or more. On the other hand, it was found that the samples (Preparation Examples 1 and 2) containing the first cerium oxide particles alone or the second cerium oxide particles alone, and the dispersion compositions (Comparative Examples 3 and 4) in which the mixing ratio of the first and second cerium oxide particles is different from the present invention exhibited a low polishing rate, for example, 11,000 Å/min or less.

From these results, the dispersion composition according to the present invention contains a cerium oxide composite powder in which two types of cerium oxide particles having specific sizes are mixed in a specific ratio, and the dispersion composition according to the present invention exhibits high polishing efficiency without damaging a substrate surface.

What is claimed is:

1. A cerium oxide composite powder dispersion composition for CMP, the composition comprising:
   first cerium oxide particles having an average particle size of 20 nm or more and less than 40 nm; and
   second cerium oxide particles having an average particle size of 1 nm to 6 nm,
   wherein the first cerium oxide particles and the second cerium oxide particles are mixed in a weight ratio of 6:4 to 4:6,
   wherein an average density of the cerium oxide composite powder contained in a solution of the dispersion composition is in a range of 1.55 g/mL to 1.77 g/mL,
   wherein the first cerium oxide particles have a prismatic shape, and the second cerium oxide particles having a spherical shape and have a surface activated by hydrothermal synthesis, and
   wherein the composition exhibits a polishing rate of 17,000 Å/min or more.

2. The composition according to claim 1, wherein when the cerium oxide composite powder is observed under a transmission electron microscope (TEM), the powder contains 50 to 19,000 second cerium oxide particles on average per unit area that is 550 nm in width and 550 nm in length per one first cerium oxide particle.

3. The composition according to claim 1, wherein an average BET specific surface area of the cerium oxide composite powder is 50.00 $m^2/g$ or more.

4. The composition according to claim 1, wherein after a concentration of the cerium oxide composite powder in the dispersion composition is adjusted to be in a range of 0.007 wt. %, transmittance of the dispersion composition is in a range of 0.02% to 0.19% when absorbance of the dispersion composition is measured at a wavelength of 450 to 600 nm and is in a range of 70% to 90% when absorbance of the dispersion composition is measured at a wavelength of 500 nm.

5. The composition according to claim 1, wherein a change in average particle size after the dispersion composition is stored at 40° C. for 30 days is 5% or less.

6. The composition according to claim 1, wherein the second cerium oxide particles have hydroxy groups on the surface thereof.

* * * * *